United States Patent
Kim et al.

(10) Patent No.: US 9,394,061 B2
(45) Date of Patent: Jul. 19, 2016

(54) TUNNEL AIR-CONDITIONING APPARATUS, PASSENGER BOARDING BRIDGE INCLUDING THE APPARATUS, PASSENGER BOARDING BRIDGE AIR-CONDITIONING SYSTEM, AND SYSTEM FOR CONTROLLING SAME

(71) Applicant: KOREA AIRPORTS CORPORATION, Seoul (KR)

(72) Inventors: Dong Soo Kim, Gimpo-si (KR); Seung Sang Cho, Incheon (KR); Seok Cheol Yang, Busan (KR)

(73) Assignee: KOREA AIRPORTS CORPORATION (KR)

( * ) Notice: Subject to any disclaimer, the term of this patent is extended or adjusted under 35 U.S.C. 154(b) by 0 days.

(21) Appl. No.: 14/782,388

(22) PCT Filed: Jan. 2, 2014

(86) PCT No.: PCT/KR2014/000009
§ 371 (c)(1),
(2) Date: Oct. 5, 2015

(87) PCT Pub. No.: WO2014/175537
PCT Pub. Date: Oct. 30, 2014

(65) Prior Publication Data
US 2016/0052645 A1  Feb. 25, 2016

(30) Foreign Application Priority Data
Apr. 26, 2013 (KR) .................. 10-2013-0046677

(51) Int. Cl.
*B64F 1/00* (2006.01)
*B64F 1/305* (2006.01)
(Continued)

(52) U.S. Cl.
CPC ............... *B64F 1/305* (2013.01); *B64F 1/362* (2013.01); *F24F 1/14* (2013.01); *F24F 1/26* (2013.01)

(58) Field of Classification Search
CPC ............ B64F 1/305; B64F 1/362; F24F 1/14; F24F 1/26
USPC .......................................... 14/71.5
See application file for complete search history.

(56) References Cited

U.S. PATENT DOCUMENTS 3,399,545 A * 9/1968 Anderson ............... B64F 1/305
138/106
4,357,860 A * 11/1982 Krzak ..................... B64F 1/305
138/120

(Continued)

FOREIGN PATENT DOCUMENTS

CN       102705918      10/2012
KR      1020080021407    3/2008

(Continued)

OTHER PUBLICATIONS

International Search Report—PCT/KR2014/000009 dated Mar. 31, 2014.

*Primary Examiner* — Raymond W Addie
(74) *Attorney, Agent, or Firm* — Cantor Colburn LLP

(57) ABSTRACT

A tunnel air-conditioning apparatus for air-conditioning a movable tunnel connected to a rotunda, the tunnel air-conditioning and heating apparatus may include an indoor unit that is mounted on the movable tunnel; an outdoor unit that is mounted on and connected to the indoor unit; and an outdoor-unit support unit that supports the outdoor unit to make the outdoor unit mounted on the indoor unit, wherein the outdoor-unit support unit may lift or lower the outdoor unit so as to adjust the space formed on the top part of the indoor unit.

31 Claims, 10 Drawing Sheets

(51) Int. Cl.
*F24F 1/14* (2011.01)
*F24F 1/26* (2011.01)
*B64F 1/36* (2006.01)

(56) References Cited

U.S. PATENT DOCUMENTS 4,526,090 A * 7/1985 Maier .................. B64F 1/305
 137/355.16
4,543,677 A * 10/1985 Haglund ............... B64F 1/305
 138/120
4,572,550 A * 2/1986 Harder ................. B64F 1/362
 14/17.5
6,993,802 B1 * 2/2006 Hone ................... B64F 1/305
 14/69.5

FOREIGN PATENT DOCUMENTS

KR 100831652 5/2008
KR 101192296 10/2012

* cited by examiner

FIG. 9

INTERNATIONAL DEPARTURES

09:25

| AIRLINES | FLIGHTS | SCHEDULED TIME | DESTINATION | ESTIMATED TIME | GATE | REMARKS |
|---|---|---|---|---|---|---|
| CCA | CA 1123 | 09:30 | SHANGHAI | 9:30 | 1 | PROCESSING |
| DLH | LH 2233 | 09:40 | MUNICH | 9:40 | 2 | PROCESSING |
| AFL | SU 1038 | 09:45 | MOSCOW | 9:45 | 2 | BOARDING |
| KAL | KE 763 | 10:05 | HANEDA | 10:05 | 3 | BOARDING |
| UAL | UA 1045 | 10:25 | NEW YORK | --:-- | 4 | CANCELLED |
| JAL | JL 5226 | 10:30 | KANSAI | --:-- | 2 | CANCELLED |
| AAR | OZ 272 | 10:50 | BEIJING | 11:20 | 2 | DELAYED |
| BAW | BA 1123 | 11:10 | LONDON | 11:55 | 2 | DELAYED |

US 9,394,061 B2

TUNNEL AIR-CONDITIONING APPARATUS, PASSENGER BOARDING BRIDGE INCLUDING THE APPARATUS, PASSENGER BOARDING BRIDGE AIR-CONDITIONING SYSTEM, AND SYSTEM FOR CONTROLLING SAME

TECHNICAL FIELD

The embodiments described herein pertain generally to a tunnel air-conditioning apparatus applicable to a tunnel of a passenger boarding bridge, a passenger boarding bridge air-conditioning system including the apparatus, a passenger boarding bridge, and a passenger boarding bridge air-conditioning control system.

BACKGROUND ART

A passenger boarding bridge is a bridge in the form of a machine for transferring passengers between an airplane and an airport terminal. Commonly, a fixed tunnel is installed from the terminal to a rotunda, and a movable passenger boarding bridge is installed from the rotunda to the airplane, such that the movable passenger boarding bridge can swerve and move by using its wheels to be adjacent to the passenger boarding bridge of the airplane. Commonly, the movable passenger boarding bridge consists of an inner tunnel and an outer tunnel, and by moving the outer tunnel to accommodate the inner tunnel therein, a length of the movable passenger boarding bridge can be adjusted.

There should be proper air-conditioning at an airport terminal and in an airplane; however, the wall of the passenger boarding bridge is manufactured from glass in most cases, and outdoor air flows through the rotunda area, above a cabin, and through gaps between an inner tunnel and an outer tunnel of the movable passenger boarding bridge so as to make the temperature at the airport terminal and in the airplane higher or lower than the proper temperature, causing complaints from passengers. In order to eliminate this inconvenience, various air-conditioning and heating systems have been installed at the passenger boarding bridge.

Regarding the conventional air-conditioning and heating apparatus for the passenger boarding bridge to solve the above-described problem, Korean Patent Publication No. 1192296 (entitled: Cooling and Heating System and Cooling and Heating Control System for Boarding Bridge), for which the patent application was filed by the applicant of the present disclosure, and the patent was granted and registered, describes a tunnel air-conditioning and heating apparatus that includes a transversely rotatable turntable on a rotunda, arranges a condenser and a compressor on the turntable to be provided on the rotunda, and provides an evaporator on a movable tunnel, so as to facilitate air-conditioning and heating in the inside of the tunnel.

However, since the conventional tunnel air-conditioning and heating apparatus should provide the turntable on the rotunda to install an outdoor unit on the rotunda, and also install clamps to enable the turntable to rotate along with the rotation of the rotunda, it has had a problem of requiring more installation and operation costs.

Also, the above-mentioned patent describes an extended tunnel air-conditioning and heating apparatus, in which a diffuser cover is installed at an extended tunnel diffuser, and an opening/closing unit for opening and closing the diffuser cover is installed at a movable tunnel, such that the extended tunnel diffuser is opened and closed by moving the diffuser cover through contact with the opening/closing unit provided at the movable tunnel according to extension or diminishment of the extended tunnel.

However, since the extended tunnel air-conditioning and heating apparatus in the conventional air-conditioning and heating system for a passenger boarding bridge should make a mold to manufacture the diffuser cover and the opening/closing unit, it has had a problem of incurring high manufacturing costs. Further, there should be spacing between the diffuser cover and a housing of the extended tunnel in order to facilitate the sliding of the diffuser cover; however, wind blows through the spacing, and noise caused from the leaking wind results in a problem of noise in the inside of the tunnel. Furthermore, in the event that most part of the extended tunnel diffuser is closed, wind is converged at the opened part of the extended tunnel diffuser, and thus, wind volume and wind velocity overly increase, resulting in the inconvenience of fluttering the hair of passengers boarding the passenger boarding bridge.

Further, due to the installation of the large reciprocating compressor, the above-mentioned patent separately installs the compressor, together with a separate motor, on the outside of the indoor unit and the outdoor unit in the integrated form, so that high manufacturing costs and high electricity costs have been consumed, and the external appearance of the apparatus has not been good.

DISCLOSURE OF THE INVENTION

Problems to be Solved by the Invention

In view of the foregoing problems, example embodiments provide a tunnel air-conditioning apparatus, which can reduce installation costs, operation costs and manufacturing costs, prevent the problems of noise caused from leakage of wind and increase of wind volume and wind velocity resulting from closing of part of a diffuser, and achieve minimization of equipment.

Means for Solving the Problems

In accordance with a first example embodiment, a tunnel air-conditioning and heating apparatus may include: an indoor unit that is provided on the movable tunnel; an outdoor unit that is provided on and connected to the indoor unit; and an outdoor-unit support unit that supports the outdoor unit to make the outdoor unit provided on the indoor unit, wherein the outdoor-unit support unit may lift or lower the outdoor unit so as to adjust the space formed on the top part of the indoor unit.

In accordance with a second example embodiment, a tunnel air-conditioning and heating apparatus may include: the tunnel air-conditioning apparatus according to a first example embodiment; and an extended tunnel air-conditioning apparatus that air-conditions an extended tunnel connected to the other end of the movable tunnel in the longitudinal direction of the movable tunnel to enable a length of the passenger boarding bridge to be extended or diminished.

In accordance with an example embodiment, an indoor unit of the extended tunnel air-conditioning apparatus may include: a first air supply fan and a second air supply fan, and the first air fan is positioned closer to the movable tunnel than the second air supply fan.

In accordance with an example embodiment, an extended tunnel air-conditioning apparatus may include: a connection opening that is connected to each of the first and second air supply fans, to enable air discharged from the first and second air supply fans to be transferred to a duct of the extended tunnel, the interior of the connection opening is partitioned to avoid that the air discharged from the first air supply an and the air discharged from the second air supply fan are mixed from each other.

In accordance with an example embodiment, on/off of each of the first air supply fan and the second air supply fan may be independently controlled.

In accordance with an example embodiment, on either an outer surface of the movable tunnel or an inner surface of the extended tunnel, there is provided an on/off unit that controls on/off of the first air supply fan, and on the other one, there is a fixing member that operates the on/off unit, and any one of the on/off unit and the fixing member is provided at a position corresponding to a moving line of the other one when the extended tunnel is extended or diminished.

In accordance with a third example embodiment, a passenger boarding bridge may include: a rotunda; a movable tunnel that is rotatably connected to the rotunda; and an extended tunnel that is connected to an end of the movable tunnel opposite to the end of the movable tunnel where the movable tunnel and the rotunda are connected to each other, wherein the extended tunnel moves slidingly to accommodate part of the movable tunnel therein, and the passenger boarding bridge air-conditioning system according to a second example embodiment is installed in the rotunda, the movable tunnel, and the extended tunnel.

In accordance with a fourth example embodiment, a passenger boarding bridge air-conditioning control system, may include: the passenger boarding bridge air-conditioning system according to a second example embodiment; and a flight management server that stores and updates departure and arrival information of an airplane; and a passenger boarding bridge air-conditioning apparatus controller that receives the departure and arrival information from the flight management server to control the passenger boarding bridge air-conditioning system.

Effect of the Invention

In accordance with the example embodiments, by providing an outdoor unit on an indoor unit by means of an outdoor-unit support unit, the whole tunnel air-conditioning apparatus can be provided on the movable tunnel, and thus, components such as a turntable and clamps are unnecessary, reducing the installation and operation costs.

Further, since air supplied by first and second air supply fans of the indoor unit of the extended tunnel air-conditioning apparatus is separated from each other, and each of the air supply fans is independently controlled, it is possible to prevent the problem of increase of wind volume and wind velocity even when part of the extended tunnel diffuser is closed.

Further, since the first air supply fan is controlled by an on/off unit and a fixing member, the diffuser cover of the conventional technology is unnecessary, and thus, it is possible to prevent the problem of noise resulting from leakage of air.

BRIEF DESCRIPTION OF THE DRAWINGS

FIG. 9 shows an example for flight information, which is stored in a flight management server.

DETAILED DESCRIPTION

Figure 1:
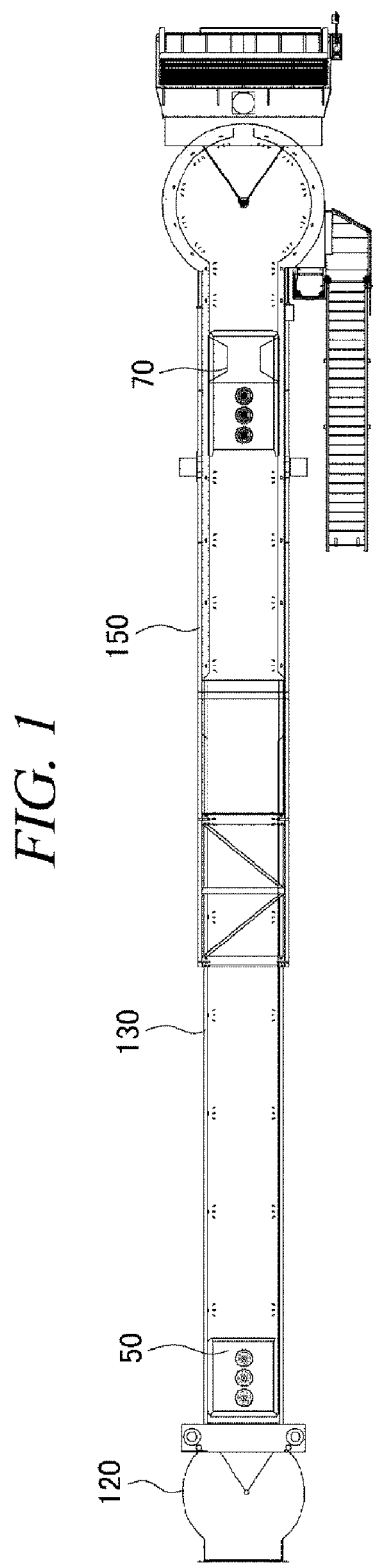
FIG. 1 is a plane view of a passenger boarding bridge, to which a passenger boarding bridge air-conditioning system in accordance with an example embodiment is applied.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operation and/or existence or addition of elements are not excluded in addition to the described components, steps, operation and/or elements unless context dictates otherwise. Throughout the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Throughout the whole document, the term "step of" does not mean "step for."

Hereinafter, the present disclosure is described in detail with reference to the accompanying drawings.

First, a tunnel air-conditioning apparatus 50 (hereinafter, referred-to as "the present tunnel air-conditioning apparatus 50") in accordance with an example embodiment of the present disclosure is described.

The present tunnel air-conditioning apparatus 50 includes an indoor unit 53.

The indoor unit 53 may transfer air into a duct of a movable tunnel 130 to introduce the air into the movable tunnel 130.

Referring to FIG. 1 to FIG. 3B, the indoor unit 53 is provided on the movable tunnel 130.

The present tunnel air-conditioning apparatus 50 includes an outdoor unit 51.

The outdoor unit 51 may be connected to the indoor unit 53 through a connection pipe (e.g., a refrigerant gas pipe).

As the conventional tunnel air-conditioning and heating apparatus has used the separate motor for the reciprocating compressor, the compressor has been positioned outside the air-conditioning and heating apparatus. Accordingly, a separate connection pipe for connecting the compressor and the air-conditioning and heating apparatus to each other has been necessary, incurring high costs and deteriorating the external appearance of the apparatus.

On the other hand, referring to FIG. 4, as the present tunnel air-conditioning apparatus 50 uses a scroll type compressor or a rotary type compressor like a compressor 711 of an extended tunnel air-conditioning apparatus 70, which will be described later, it can provide the compressor in the inside of the indoor unit 51. Accordingly, since the present tunnel air-conditioning apparatus 50 has only to connect the indoor unit 53 and the outdoor unit 51 to each other, it can reduce manufacturing costs and facilitate maintenance and repair, compared to the conventional tunnel air-conditioning and heating apparatus that has needed many connection pipes to connect the condenser, the compressor and the evaporator to one another. Further, as the compressor of the present tunnel air-conditioning apparatus 50 is not exposed to the outside, the external appearance of the apparatus is improved.

The present tunnel air-conditioning apparatus 50 includes an outdoor-unit support unit 55.

Figure 2:
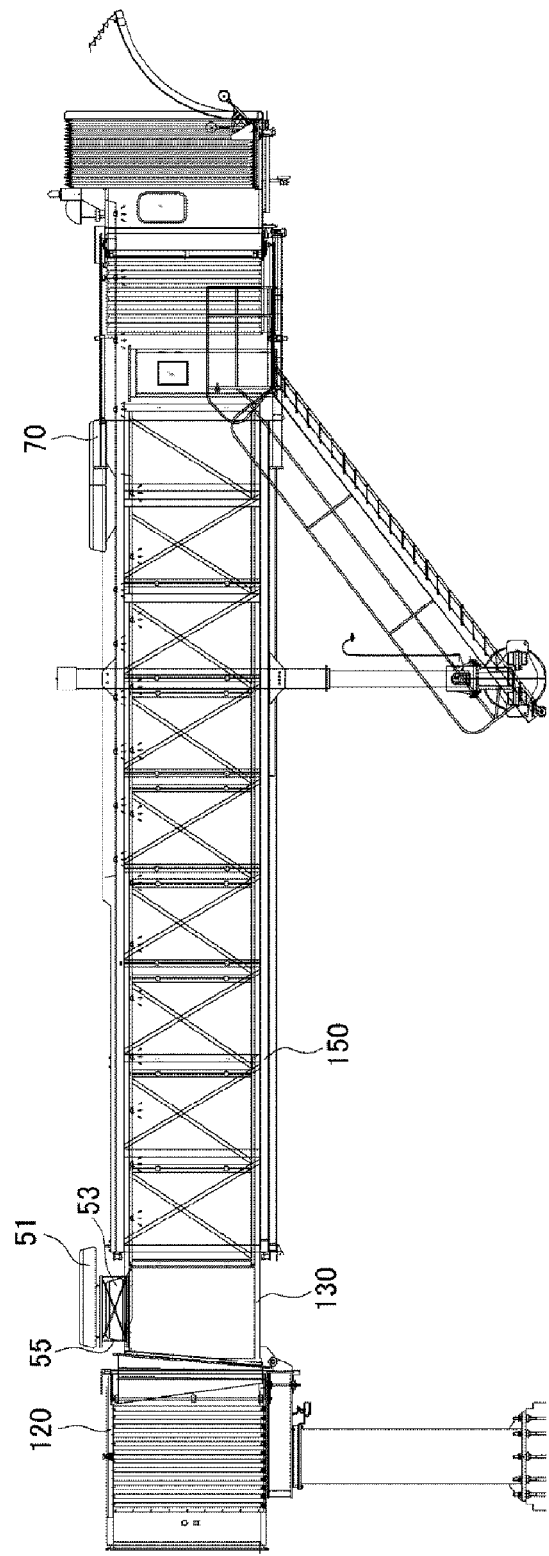
FIG. 2 is a side view of the passenger boarding bridge, to which the passenger boarding bridge air-conditioning system in accordance with the example embodiment is applied.

Referring to FIG. 1 and FIG. 2, the outdoor unit 51 may be supported by the outdoor-unit support unit 55 to be positioned on the indoor unit 53.

Figure 3A:
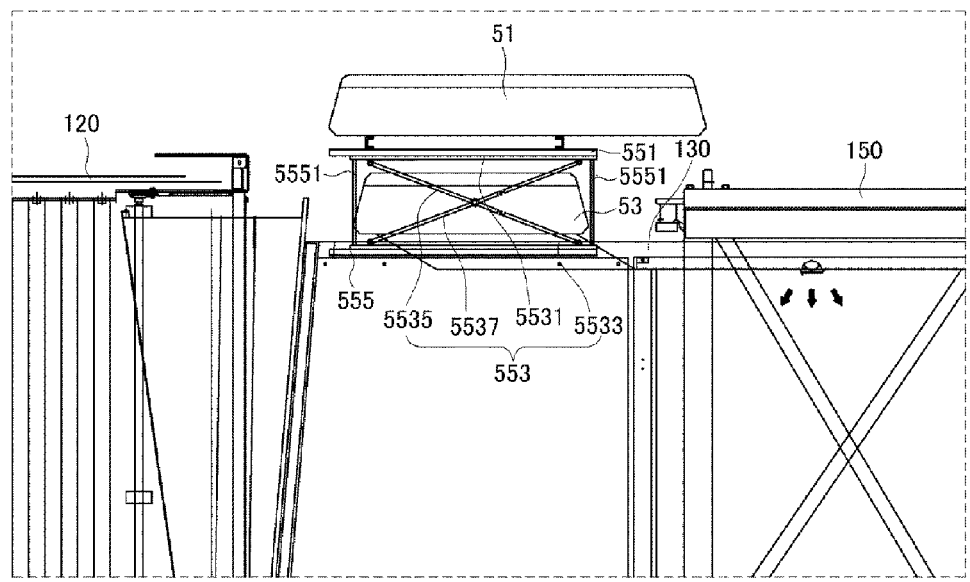
FIG. 3A and FIG. 3B is an enlarged front view describing a tunnel air-conditioning apparatus in accordance with an example embodiment.
Figure 3B:
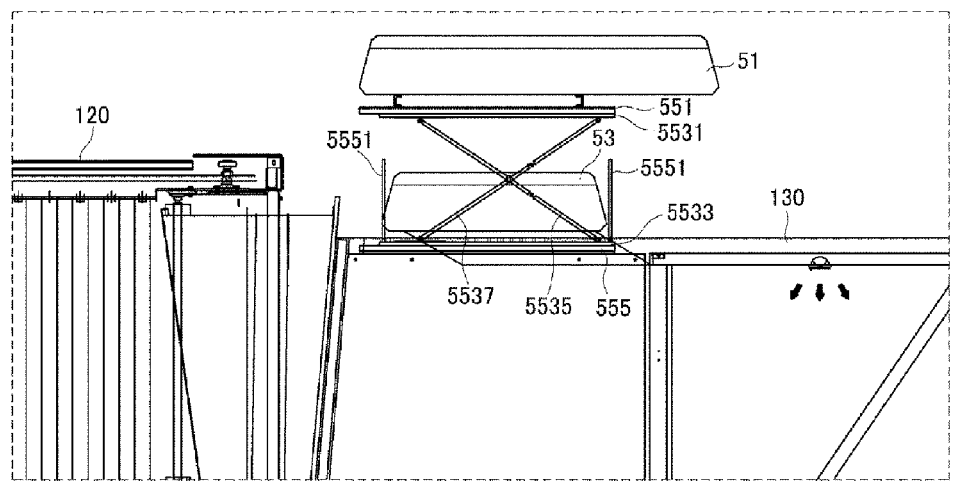

The outdoor unit 51 includes all components corresponding to the condenser and the compressor, and the indoor unit 53 includes all components corresponding to the evaporator. Accordingly, as illustrated in FIG. 3A and FIG. 3B, the volume of the outdoor unit 51 may be larger than that of the indoor unit 53.

If a boarding gate of an airplane is not distant from a fixed tunnel 110, the total length of the passenger boarding bridge should be shortened. In this case, since the extended tunnel 150 has wheels on its bottom, and thus, can move slidingly, the length of the passenger boarding bridge is adjusted by movement of the extended tunnel 150. Accordingly, if the length of the passenger boarding bridge needs to be shortened, the extended tunnel 150 moves slidingly to accommodate the movable tunnel 130 therein.

Figure 5:
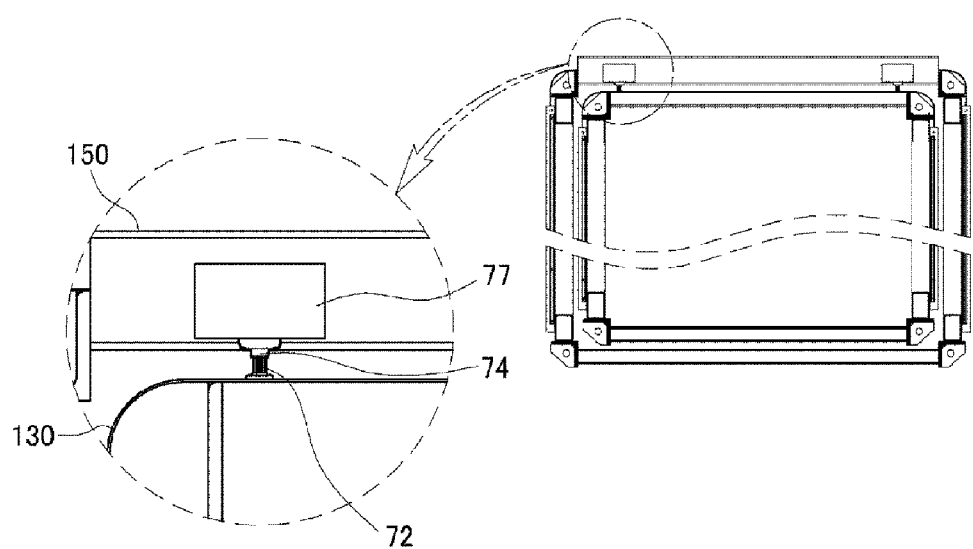
FIG. 5 is a schematic enlarged cross-sectional view describing an on/off unit and a fixing member.

In this case, as illustrated in FIG. 2, part of the movable tunnel 130 is positioned inside the extended tunnel 150, and another part thereof is positioned outside the extended tunnel 150. Referring to FIG. 2 and FIG. 5, at an upper part of the movable tunnel 130 positioned inside the extended tunnel 150, there is no space for installing an air-conditioning apparatus. In addition, if the height of the extended tunnel 150 is increased to make space for installing an air-conditioning apparatus at the upper part of the movable tunnel 130, the inner space of the extended tunnel 150 is increased, and as such, an extended tunnel air-conditioning apparatus 70, which will be described later, alone cannot sufficiently air-condition and heat the inside of the extended tunnel 150.

That is, only at an upper part of the movable tunnel 130 positioned outside the extended tunnel 150, space for installing an air-conditioning apparatus is made. However, this space is also too narrow to install both the outdoor unit 51 and the indoor unit 53 therein.

Due to the restriction in space, the conventional air-conditioning and heating apparatus has installed the evaporator on the movable tunnel, and the compressor and the condenser on the turntable provided on the rotunda. However, since the conventional air-conditioning and heating apparatus should install the turntable on the top surface of the rotunda, and also install clamps to enable the turntable to be rotated along with the rotation of the rotunda, it has had a problem of consuming a large amount of manufacturing and operation costs.

Accordingly, as illustrated in FIG. 2, the present tunnel air-conditioning apparatus 50 provides the indoor unit 53 having a small volume at the narrow space on the movable tunnel 130 so as to not be interfered with the extended tunnel 150, and the outdoor unit 51 having a relatively large volume on the indoor unit 53, such that the outdoor unit 51 and the indoor unit 53 can be provided on the movable tunnel 130 without requiring components such as a turntable and clamps. Thus, the present tunnel air-conditioning apparatus 50 can reduce installation and operation costs.

In this case, one of both ends of the outdoor unit 51, which is adjacent to the rotunda 120, may be provided to not be interfered with the rotunda 120.

That is, as illustrated in FIG. 2 to FIG. 3B, one of both the ends of the outdoor unit 51, which is adjacent to the rotunda 120, may be provided to be positioned on the movable tunnel 130. In other words, one end of the outdoor unit 51 may be provided to not be positioned on the rotunda 120.

The movable tunnel 130 may be rotated by an angle of about 4.7 degrees in an upward or downward direction. In this case, if one end of the outdoor unit 53 is positioned on the rotunda 120, the rotunda 120 may be caught in the one end of the outdoor unit 51 when the moveable tunnel 130 is rotated in an upward direction. That is, the outdoor unit 53 may be interfered by the rotunda 120, and thereby, disturbing the rotation of the movable tunnel 130.

Accordingly, as the present tunnel air-conditioning apparatus 50 allows the outdoor unit 51 to be positioned only on the movable tunnel 130, it does not disturb the rotation of the movable tunnel 130.

In addition, the outdoor-unit support unit 55 may lift or lower the outdoor unit 51 so as to adjust the space formed on the top part of the indoor unit 53. Here, the space formed on the top part of the indoor unit 53 desirably means a space, which is large enough to perform repair or replacement of the indoor unit 53.

If repair or replacement of the indoor unit 53 is necessary, the outdoor-unit support unit 55 may lift the outdoor unit 51 as illustrated in FIG. 3B such that the indoor unit 53 can be repaired or replaced. When the repair or the replacement of the indoor unit 53 is completed, the outdoor-unit support unit 55 may lower the outdoor unit 51 again as illustrated in FIG. 3A.

In addition, the indoor unit 53 and the outdoor unit 51 may be connected to each other through a connection pipe. In this case, since the outdoor unit 51 may be lifted or lowered by the outdoor-unit support unit 55, the connection pipe may be flexible so as to maintain the connection even when the height of the outdoor unit 51 changes. That is, the connection pipe may have a length and flexibility sufficient enough to maintain the connection even when the outdoor unit 51 is lifted up to the maximum height, and the outdoor unit 51 is lowered up to the minimum height.

The outdoor-unit support unit 55 may include an upper support 551. Also, the outdoor-unit support unit 55 may include a lower support 555.

Referring to FIG. 3A and FIG. 3B, the outdoor unit 51 may be installed on the upper support 551, and the indoor unit 53 may be installed on the lower support 555. In addition, a lift 553 may be installed between the upper support 551 and the lower support 555.

As illustrated in FIG. 3B, the lift 553 may lift or lower the upper support 551, so as to adjust the space formed on the top part of the indoor unit 53.

Two (2) lifts 553 may be provided. The two (2) lifts 553 may be installed at both sides of the lower support 555 along the longitudinal direction of the movable tunnel 130. However, the number of the lifts 553 is not limited to two (2) and may be one (1) or three (3) or more.

The lower support 555 may have a perpendicular support rod 5551 supporting the upper support 551, at a height of a limit for the lowering of the upper support 551 by the lift 553. In this case, the perpendicular support rod may be plural in number.

Here, the height of the limit for the lowering of the upper support 551 may mean a height of the upper support 551 in the state that the upper support 551 is not lifted, i.e., in the state that the outdoor unit 51 is lowered to the maximum.

Referring to FIG. 3A, if the outdoor unit 51 is positioned at the lowest portion, an end of the perpendicular support rod 5551 contacts the bottom surface of the upper support 551, so as to support the upper support 551. That is, the weight of the outdoor unit 51 is also applied to the perpendicular support rod 5551 as well as the lift 553, and as a result, the outdoor unit 51 can be more stably supported. Furthermore, scissors and a shock absorber, which will be described later, also may not be overloaded.

In addition, when the lift 553 is positioned between the upper support 551 and the lower support 555, if the other end of the outdoor unit 51 is protruded toward a direction away from the rotunda 120 with respect to the upper support 551, the lift 553 may be eccentrically positioned toward the direction away from the rotunda 120 based on the upper support 551 and the lower support 555 so as to avoid overturn of the outdoor unit 51.

That is, if the other end of the outdoor unit 51 is protruded onto the movable tunnel 130 as illustrated in FIG. 3A and FIG. 3B, the center of the longitudinal direction of the lift 553 may be eccentric in the direction away from the rotunda 120, compared to the center of the longitudinal direction of each of the upper support 551 and the lower support 553, for maintenance of balance.

This lift 553 may be a scissors lift as illustrated in FIG. 2 to FIG. 3B

The lift 553 may include scissors having a first arm 5535, of which one end is connected to the upper support 551, and the other end is connected to the lower support 555, and a second arm 5537, of which one end is connected to the lower support 555, and the other end is connected to the upper support 551.

In this case, the other end of the first arm 5535 and the other end of the second arm 5537 are fixed, the one end of the first arm 5535 slides along the upper support 551, and the one end of the second arm 5537 slides along the lower support 555, such that the upper support 551 can be lifted or lowered.

Referring to FIG. 3A and FIG. 3B, the one end of the first arm 5535 may be positioned closer to the rotunda 120 than the other end of the first arm 5535, and slide along the longitudinal direction of the movable tunnel 130. In addition, the one end of the second arm 5537 may be positioned closer to the rotunda 120 than the other end of the second arm 5537, and slide along the longitudinal direction of the movable tunnel 130.

In addition, as illustrated in FIG. 3A and FIG. 3B, the lift 553 may include an upper plate 5531 provided on the bottom side of the upper support 551, and a lower plate 5533 provided on the top side of the lower support 555. In this case, the one end of the first arm 5535 may be connected to the upper plate 5531, and the other end thereof may be connected to the lower plate 5533. Also, the other end of the second arm 5537 may be connected to the upper plate 5531, and the other end thereof may be connected to the lower plate 5533.

Referring to FIG. 3B, the one end of the first arm 5535 slides in the arrow direction along the upper plate 5531, and the other end of the second arm 5537 slides in the arrow direction along the lower plate 5533, such that the upper support 551 can be lifted. Accordingly, the outdoor unit 51 can be lifted.

In the state that the passenger boarding bridge is diminished to the minimum, the outdoor-unit support unit 55 may be installed only on the movable tunnel 130 positioned outside the extended tunnel 150. That is, the length of the outdoor-unit support unit is limited.

For this reason, as illustrated in FIG. 3A and FIG. 3B, the length of the outdoor unit 51 may be longer than that of the outdoor-unit support unit 55. Accordingly, the other end of the outdoor unit 51 may not be entirely supported by the upper support 551 and may be partially protruded onto the movable tunnel 130. That is, the other end of the outdoor unit 51 cannot be stably supported, compared to the one end thereof.

Accordingly, in order to stably lift or lower the outdoor unit 51, it is desirable to fix the other end of the first arm 5535 and the other end of the second arm 5537, which are positioned close to the other end of the outdoor unit 51 that is instable, and slide the one end of the first arm 5535 and the one end of the second arm 5537, which are positioned close to the one end of the outdoor unit 51 that is relatively stably installed.

At the scissors, there may be installed a shock absorber performing a buffering function when the upper support 551 is lowered, or a hydraulic or power cylinder to facilitate the lift of the upper support 551.

Through the shock absorber, the hydraulic cylinder or the power cylinder, the first arm 5535 and the second arm 5537 may be protected against shocks, and the first arm 5535 and the second arm 5537 may easily lift the upper support 551.

Meanwhile, although not illustrated in the drawings, the present tunnel air-conditioning apparatus 50 may further include a heating apparatus.

By way of example, the heating apparatus may be a heating apparatus according to the heat pump principle. The heating apparatus according to the heat pump principle may be embodied in the manner that a refrigerant compressed in the outdoor unit 51 to be in the high temperature and high pressure state emits heat. In this case, as illustrated in FIG. 1 to FIG. 3B, the outdoor unit 51 may be installed on the upper support 551, allowing heat to be transferred into the movable tunnel 130 through a pipe or the like.

Meanwhile, in another example, the heating apparatus may be an electric heater apparatus. Or, an electric heater apparatus may be secondarily added to the above-described heating apparatus according to the heat pump principle.

Meanwhile, a passenger boarding bridge air-conditioning system (hereinafter, referred-to as "the present passenger boarding bridge air-conditioning system") in accordance with an example embodiment of the present disclosure is described. However, components or configuration of the present passenger boarding bridge air-conditioning system, which are identical or similar to those of the tunnel air-conditioning apparatus in accordance with an example embodiment of the present disclosure, will be denoted by the same reference numerals as used for the tunnel air-conditioning apparatus, and overlapping descriptions will be summarized or omitted.

The present passenger boarding bridge air-conditioning system includes the present tunnel air-conditioning apparatus 50.

As described above, the present tunnel air-conditioning apparatus 50 is installed for air-conditioning of the movable tunnel 130.

The present passenger boarding bridge air-conditioning system includes the extended tunnel air-conditioning apparatus 70.

The extended tunnel air-conditioning apparatus 70 is configured to air-condition the extended tunnel 150, which is extendably connected to an end of the movable tunnel 130 opposite to the end of the movable tunnel 130 where the movable tunnel 130 is connected to the rotunda 120, i.e., the other end of the movable tunnel 130, in the longitudinal direction of the movable tunnel 130.

The extended tunnel 150 may have a greater height than that of the movable tunnel 130 as illustrated in FIG. 2, and has wheels on its bottom so as to move. Accordingly, when the boarding gate of the airplane and the rotunda 120 are connected to each other by the passenger boarding bridge, it is possible to properly move the extended tunnel 150.

In addition, the extended tunnel 150 may adjust a length of the passenger boarding bridge. That is, the extended tunnel 150 may slide to accommodate part of the movable tunnel 130 therein so as to adjust the length of the passenger boarding bridge.

The extended tunnel air-conditioning apparatus 70 may be installed on the extended tunnel 150 positioned close to the boarding gate of the airplane as illustrated in FIG. 1 and FIG. 2.

Unlike the movable tunnel 130, the extended tunnel 150 is not limited with respect to installation of an air-conditioning apparatus. This is because only part of the movable tunnel 130 is accommodated within the extended tunnel 150 when the total length of the passenger boarding bridge is adjusted. Accordingly, if part of the movable tunnel 130 is accommodated within the extended tunnel 150, at the upper part of the movable tunnel 130, a sufficient space for installing an air-conditioning apparatus cannot be obtained. On the other hand, since the extended tunnel 150 is not accommodated within another tunnel, there is a sufficient space for installing an air-conditioning apparatus at the upper part of the extended tunnel 150.

In this case, since the tunnel air-conditioning apparatus 50 is installed across the rotunda 120 and the movable tunnel 130, the movable tunnel 130 and the part of the extended tunnel 150 connected to the movable tunnel 130 can be sufficiently air-conditioned by the tunnel air-conditioning apparatus 50. Thus, it is desirable to install the extended tunnel air-conditioning apparatus 70 in order to air-condition the space that is difficult to be sufficiently air-conditioned by the tunnel air-conditioning apparatus 50. Therefore, it is desirable to install the extended tunnel air-conditioning apparatus 70 to be as distant as possible from the tunnel air-conditioning apparatus 50 as illustrated in FIG. 1 and FIG. 2. However, this is merely an example, and the position where the extended tunnel air-conditioning apparatus 70 is installed is not limited to the position illustrated in FIG. 1 and FIG. 2.

The indoor unit 73 of the extended tunnel air-conditioning apparatus 70 may include a first air supply fan 731 and a second air supply fan 733. In this case, the first air supply fan 731 may be positioned closer to the movable tunnel 130 than the second air supply fan 733.

Figure 4:
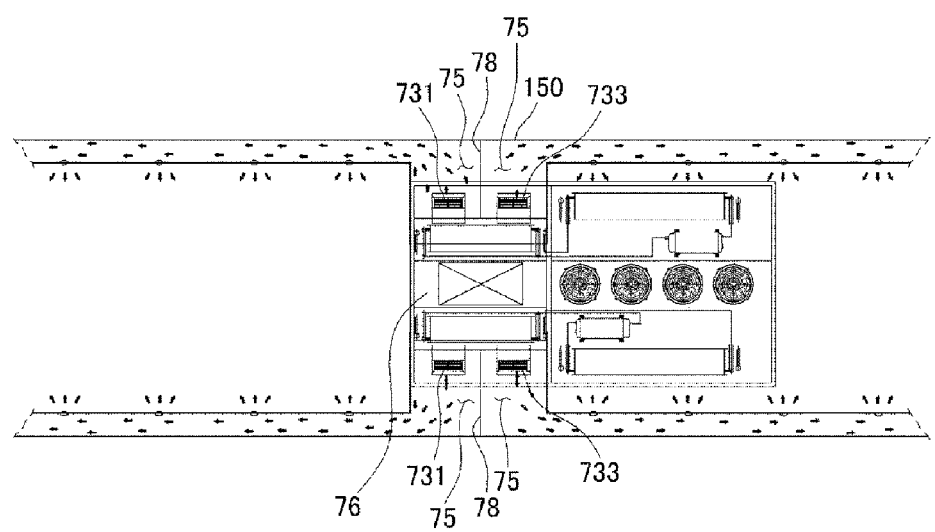
FIG. 4 is an enlarged plane view describing an extended tunnel air-conditioning apparatus of the passenger boarding bridge air-conditioning system in accordance with an example embodiment.

FIG. 4 is a plane view schematically illustrating that air for air-conditioning, which is supplied from the indoor unit 53 of the extended tunnel 150, flows into the extended tunnel 150 through an extended tunnel duct 77. Here, an extended tunnel duct 77 may be installed between the roof and the ceiling of the extended tunnel 150 or on the roof of the extended tunnel 150. Accordingly, the extended tunnel duct 77 may be provided to avoid interference with the movable tunnel 130 even when the length of the passenger boarding bridge is diminished, i.e., the movable tunnel 130 is accommodated into the extended tunnel 150.

The first air supply fan 731 may supply air for air-conditioning the part of the extended tunnel 150, which is adjacent to the movable tunnel 130. In addition, the second air supply fan 733 may supply air for air-conditioning the other part of the extended tunnel 150, which is adjacent to the boarding gate, as illustrated in FIG. 4.

For example, as illustrated in FIG. 4, the interior of connection openings 75, which are connected to the first air supply fan 731 and the second air supply fan 733, may be partitioned by a partition wall 78.

The extended tunnel air-conditioning apparatus 70 may include the connection openings 75, which are connected to the first air supply fan 731 and the second air supply fan 733, respectively, so as to transfer air discharged from the first air supply fan 731 and the second air supply fan 733 to the extended tunnel duct 77. In this case, the interior of the connection openings 75 may be partitioned to avoid that the air discharged from the first air supply fan 731 and the air discharged from the second air supply fan 733 are mixed with each other.

As described, by separating the air for air-conditioning, which is discharged from the first air supply fan 731, and the air for air-conditioning, which is discharged from the second air supply fan 733, from each other, wind may not be converged at an opened part of an extended tunnel diffuser even if part of the extended tunnel diffuser is closed.

More specifically, when the movable tunnel 130 is inserted into the extended tunnel 150, even if part of the extended tunnel diffuser, which supplies the air discharged from the first air supply fan 731 into the tunnel, is closed, the air discharged from the first air supply fan 731 cannot move to the duct of the extended tunnel connected to the second air supply fan 733 thanks to the partition wall 78. Accordingly, since wind is not converged at the extended tunnel diffuser in the opened state, it is possible to eliminate the inconvenience of fluttering the passengers' hair resulting from excessive increase of wind volume and wind velocity in the conventional air-conditioning system for the passenger boarding bridge.

On/off of each of the first air supply fan 731 and the second air supply fan 733 may be independently controlled.

When part of the movable tunnel 130 is inserted into the extended tunnel 150 along with the movement of the extended tunnel 150, the inside of the extended tunnel 150, into which the movable tunnel 130 has been inserted, can be air-conditioned by the air supplied by the diffuser of the movable tunnel 130. Accordingly, the first air supply fan 731 positioned adjacent to the movable tunnel 130 does not need to be operated.

Accordingly, as the present passenger boarding bridge air-conditioning system allows only the second air supply fan 733 to operate, it enables the extended tunnel air-conditioning apparatus 70 to supply air for air-conditioning only to the inside of the extended tunnel 150 where the movable tunnel 130 is not positioned. Accordingly, unnecessary power consumption is reduced, so that the effective air-conditioning system as a whole can be realized.

On either an outer surface of the movable tunnel 130 or an inner surface of the extended tunnel 150, there may be provided an on/off unit 72 that controls on/off of the first air supply fan 731, and on the other one, there may be a fixing member 74 that operates the on/off unit 72, in which any one of the on/off unit 72 and the fixing member 75 may be provided at a position corresponding to a moving line of the other one when the extended tunnel 150 is extended or diminished.

In this case, if the fixing member 74 is provided at the extended tunnel 150 as illustrated in FIG. 5, the on/off unit 72 may be provided on the movable tunnel 130 so as to be located at a position corresponding to the moving line of the fixing member 74 along with the movement of the extended tunnel 150.

Figure 6A:
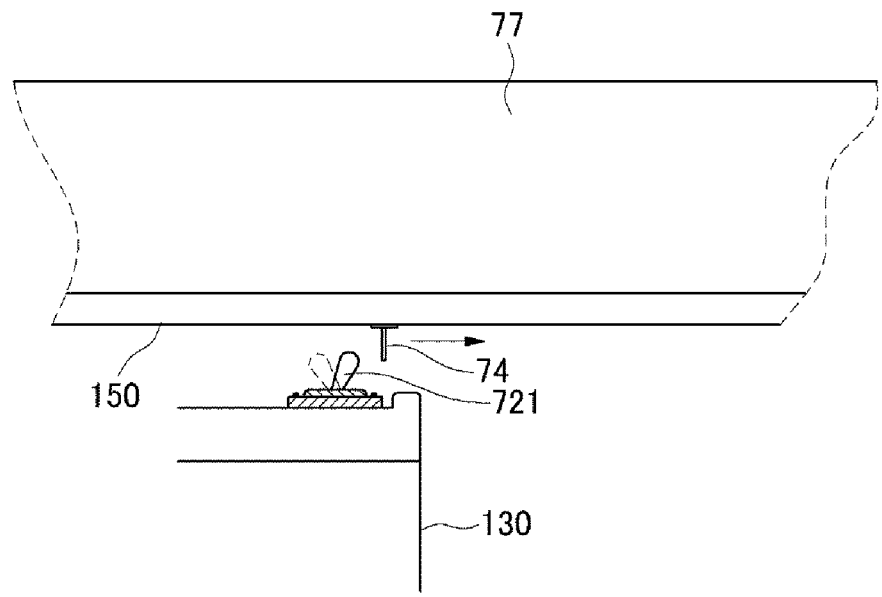
FIG. 6A and FIG. 6B is an enlarged front view describing that the extended tunnel air-conditioning apparatus operates by the fixing member when the on/off unit is a toggle switch.
Figure 7A:
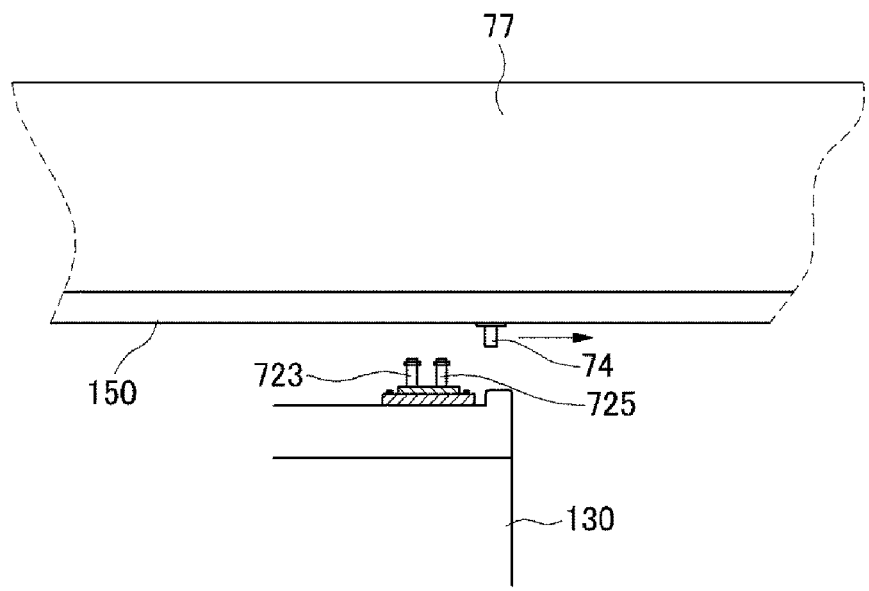
FIG. 7A and FIG. 7B is an enlarged front view describing that the extended tunnel air-conditioning apparatus operates by the fixing member when the on/off unit is a first sensor and a second sensor.

As illustrated in FIG. 6A and FIG. 7A, when the extended tunnel 150 moves in the direction that the length of the passenger boarding bridge is extended, it is difficult to air-condition the entire inside of the extended tunnel 150 only with the second air supply fan 733. Accordingly, referring to FIG. 6A and FIG. 7A, the on/off unit 72 may operate the first air supply fan 731 in response to the movement of the fixing member 74 in the arrow direction, so as to air-condition the entire inside of the extended tunnel 150.

Figure 6B:
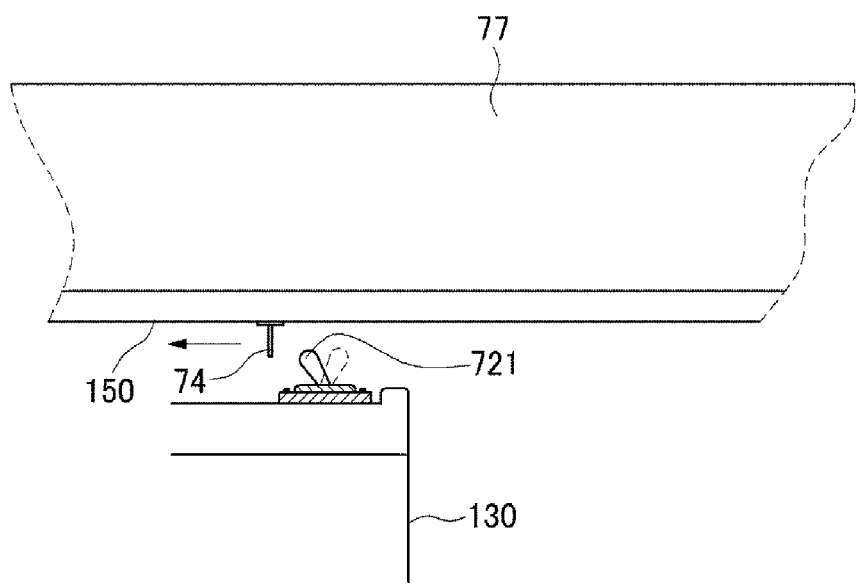
Figure 7B:
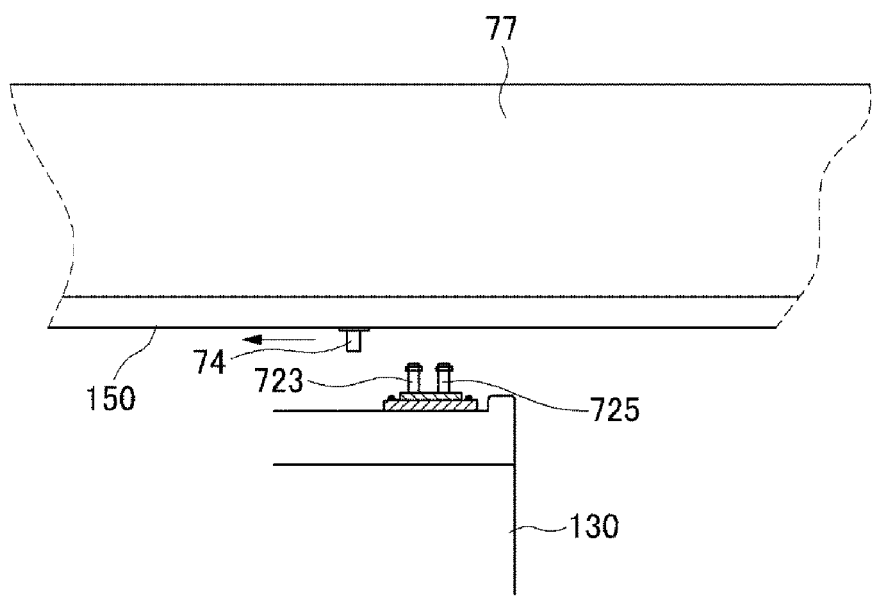

To the contrary, as illustrated in FIG. 6B and FIG. 7B, when the extended tunnel 150 moves in the direction that the length of the passenger boarding bridge is diminished, it is possible to sufficiently air-condition the entire inside of the extended tunnel 150 with the second air supply fan 733 alone. Accordingly, referring to FIG. 6B and FIG. 7B, the on/off unit 72 may stop the operation of the first air supply fan 731 in response to the movement of the fixing member 74 in the arrow direction, so that unnecessary power consumption can be prevented.

By way of an example, as illustrated in FIG. 6A and FIG. 6B, the on/off unit 72 may be a toggle switch 721.

Referring to FIG. 6A, when the fixing member 74 moves in the arrow direction as the extended tunnel 150 moves in the direction that the length of the passenger boarding bridge is extended, the fixing member 74 contacts the toggle switch 721, so as to operate the toggle switch 721 from the off direction (indicated by a dotted line) to the on direction (indicated by a solid line). As a result, the first air supply fan 731 may be operated.

Referring to FIG. 6B, when the fixing member 74 moves in the arrow direction as the extended tunnel 150 moves in the direction that the length of the passenger boarding bridge is diminished, the fixing member 74 contacts the toggle switch 721, so as to operate the toggle switch 721 from the on direction (indicated by a dotted line) to the off direction (indicated by a solid line). As a result, the operation of the first air supply fan 731 may be stopped.

In another example, as illustrated in FIG. 7A and FIG. 7B, the on/off unit 72 may include a first sensor 723 and a second sensor 725.

Referring to FIG. 7A, when the extended tunnel 150 moves in the direction that the length of the passenger boarding bridge is extended such that the fixing member 74 moves in the arrow direction, the fixing member 74 is sensed by the first sensor 723 and the second sensor 725 in this order. That is, when the fixing member 74 is first sensed by the first sensor 723, and then, by the second sensor 725, the first air supply fan 731 may be operated.

Referring to FIG. 7B, when the extended tunnel 150 moves in the direction that the length of the passenger boarding bridge is diminished such that the fixing member 74 moves in the arrow direction, the fixing member 74 is sensed by the second sensor 725 and the first sensor 723 in this order. That is, when the fixing member 74 is first sensed by the second sensor 725, and then, by the second sensor 723, the operation of the first air supply fan 731 may be stopped.

The extended tunnel air-conditioning apparatus 70 may include an extended tunnel return 76 that transfers exterior air to the outdoor unit 71 of the extended tunnel air-conditioning apparatus 70.

The extended tunnel return 76 may draw exterior air thereinto and transfer the air to the outdoor unit 71 of the extended tunnel air-conditioning apparatus 70, so as to enable the outdoor unit 71 to change the exterior air into air for air-conditioning.

Referring to FIG. 4, the extended tunnel return 76 may be provided in the indoor unit 73 of the extended tunnel air-conditioning apparatus 70.

In the inside of the outdoor unit 71 of the present extended tunnel air-conditioning apparatus 70, there may be provided a compressor.

The conventional extended tunnel air-conditioning and heating apparatus has used a separate motor for the reciprocating compressor, and provided the compressor on the outside of the air-conditioning and heating apparatus. Thus, the conventional extended tunnel air-conditioning and heating apparatus has required high costs and deteriorated its exterior appearance.

On the other hand, as the present extended tunnel air-conditioning apparatus 70 uses a scroll type compressor or a rotary type compressor, it can provide the compressor within the outdoor unit 71. Accordingly, the present extended tunnel air-conditioning apparatus 70 reduces the manufacturing costs, compared to the conventional extended tunnel air-conditioning and heating apparatus, which has been manufactured and installed in the integrated form. Further, since the compressor of the present extended tunnel air-conditioning apparatus 70 is provided to not be seen from the outside, the exterior appearance of the apparatus is improved.

Meanwhile, a passenger boarding bridge (hereinafter, referred-to as "the present passenger boarding bridge") in accordance with an example embodiment of the present disclosure is described.

The present passenger boarding bridge includes the rotunda 120 and the movable tunnel 130 rotatably connected to the rotunda 120. The present passenger boarding bridge includes the extended tunnel 150 that is connected to the end of the movable tunnel 130, which is opposite to the end of the movable tunnel 130 where the movable tunnel 130 and the rotunda 130 are connected to each other. In this case, the extended tunnel 150 may move slidingly such that part of the movable tunnel 130 is positioned in the inside of the extended tunnel 150.

In this case, the present passenger boarding bridge air-conditioning system may be applied to the movable tunnel 130 and the extended tunnel 150.

For the tunnel air-conditioning apparatus 50 and the extended tunnel air-conditioning apparatus 70 of the passenger boarding bridge air-conditioning system applied to the present passenger boarding bridge, an air-conditioning apparatus in a larger size (high power) than the conventionally applied building air-conditioning apparatus may be used.

At the present passenger boarding bridge, the air-conditioning apparatus may be divided and provided through the outdoor-unit support unit 55 provided on the upper part of the movable tunnel 130, and thus, an air-conditioning apparatus having a larger size than the conventional air-conditioning and heating apparatus for a passenger boarding bridge may be applied. That is, a large-size air-conditioning apparatus may be divided into two parts, in which one part may be provided on the upper support 551, and the other part may be provided on the lower support 555.

As described above, the conventional air-conditioning and heating apparatus for a passenger boarding bridge has been divided into two parts, of which one part has been provided on the rotunda 120, and the other part has been provided on the movable tunnel 130, through the turntable and the clamps; however, in this case, there has been the disadvantage of incurring much manufacturing and operation costs.

However, as the tunnel air-conditioning apparatus 50 applied to the present passenger boarding bridge can be divided and provided on the upper part of the movable tunnel 130 without requiring the turntable and the clamps, it can reduce the manufacturing and operation costs.

By way of example, with respect to the above-described large-size air-conditioning apparatus, an air-conditioning apparatus used in a bus may be applied.

For the air-conditioning and heating apparatus used in the conventional movable tunnel, a building air-conditioning apparatus has been used. The building air-conditioning apparatus has been manufactured to be suitable for the small number of occupants, and thus, if the apparatus should have been applied to a long movable tunnel with the large number of occupants, sufficient air-conditioning and heating could not have been supplied due to a small air volume.

A bus and the movable tunnel 130 are somewhat similar to each other in terms of a size of an interior space such as a width. The air-conditioning and heating apparatus used in a bus can supply air-conditioning and heating with a sufficient air volume in spite of the large number of occupants. Accordingly, the air-conditioning and heating apparatus used in the bus can also be applied to the movable tunnel 130 having a similar interior space to that of the bus.

Meanwhile, a passenger boarding bridge air-conditioning control system (hereinafter, referred-to as 'the present passenger boarding bridge air-conditioning control system') in accordance with an example embodiment of the present disclosure is described.

The present passenger boarding bridge air-conditioning control system includes the present passenger boarding bridge air-conditioning system.

The passenger boarding bridge air-conditioning system can be applied to a single passenger boarding bridge or each of a multiple number of passenger boarding bridges.

The present passenger boarding bridge air-conditioning control system includes a flight management server 10.

The flight management server 10 stores an arrival or departure schedule of airplanes, i.e., flight information of airplanes therein. Such flight information of airplanes is transmitted to and shared with an aeronautical telecommunication network (not illustrated).

Figure 8:
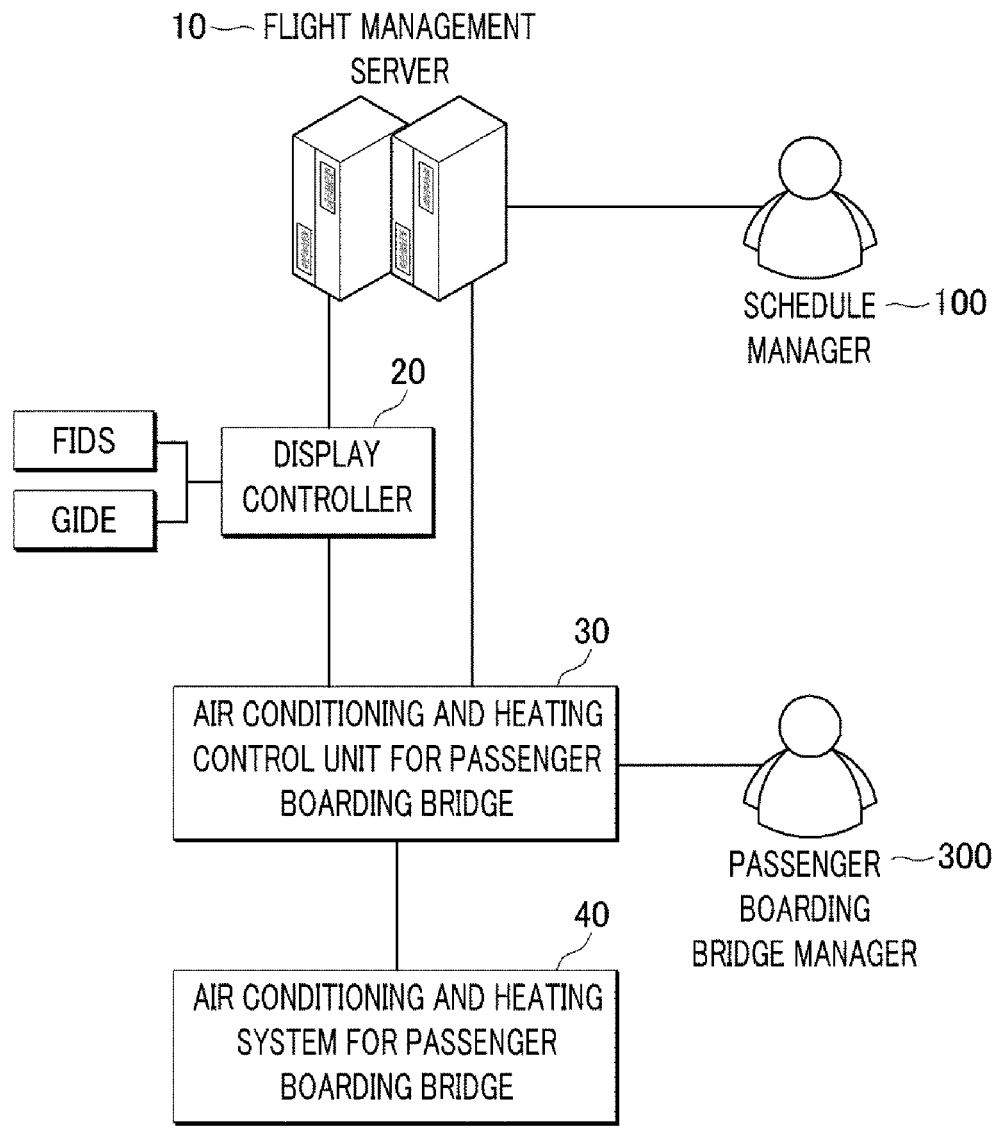
FIG. 8 is a configuration view showing a method of controlling each passenger boarding bridge air-conditioning system through a passenger boarding bridge air-conditioning control system in accordance with an example embodiment.

Referring to FIG. 8, a schedule manager 100 may input accurate flight information, which changes in real time, into the flight management server 10 to update the flight information of airplanes stored in the flight management server 10 in real time.

The flight management server 10 may transmit the flight information of airplanes to a display controller 20 or a passenger boarding bridge air-conditioning apparatus controller 30, which will be described later.

The present passenger boarding bridge air-conditioning control system includes the passenger boarding bridge air-conditioning apparatus controller 30.

The passenger boarding bridge air-conditioning apparatus controller 30 may operate the tunnel air-conditioning apparatus 50 and the extended tunnel air-conditioning apparatus 70 at a preset time prior to a departure time of departure information of an airplane, to which the passenger boarding bridge will be connected, or an arrival time of arrival information thereof.

The present passenger boarding bridge air-conditioning control system may operate the tunnel air-conditioning apparatus 50 and the extended tunnel air-conditioning apparatus 70 in advance only for an appropriate time, during which passengers use the passenger boarding bridge, instead of operating them all the time. Generally, since the passenger boarding bridge would be used prior to a departure time of an airplane or after an arrival time of an airplane, the air-conditioning apparatus may be operated only for this period of time to keep the proper set temperature in the tunnel.

Accordingly, the passenger boarding bridge air-conditioning apparatus controller 30 may preset a specific time to operate the tunnel air-conditioning apparatus and the extended tunnel air-conditioning apparatus at the preset time prior to a departure or arrival time of an airplane, and control the tunnel air-conditioning apparatus and the extended tunnel air-conditioning apparatus to be operated when the preset time is reached.

By way of example, the preset time may be determined by obtaining an average value of time periods for reaching the proper temperature, compared with an operation time of the tunnel air-conditioning apparatus and the extended tunnel air-conditioning apparatus, which are set depending on a length of the passenger boarding bridge, a capacity of the tunnel air-conditioning apparatus and the extended tunnel air-conditioning apparatus, an external air temperature and others, and calculating data for proper equipment operation time periods by the external air temperatures.

Also, the passenger boarding bridge air-conditioning apparatus controller 30 may stop the operation of the tunnel air-conditioning apparatus 50 and the extended tunnel air-conditioning apparatus 70 after the preset time, depending on information about the number of passengers from the flight management server 10. For example, if the number of passengers is large, the passenger boarding bridge air-conditioning apparatus controller 30 may set the preset time to be lengthened, and stop the operation of the air-conditioning apparatus 50, 70 after the lengthened time. To the contrary, if the number of passengers is small, the passenger boarding bridge air-conditioning apparatus controller 30 may set the preset time to be shortened, and stop the operation of the air-conditioning apparatus 50, 70 after the shortened time.

Referring to FIG. 8, the passenger boarding bridge air-conditioning apparatus controller 30 may receive flight information of an airplane, to which the corresponding passenger boarding bridge will be connected, from the display controller 20 or the flight management server 10.

For example, the passenger boarding bridge air-conditioning apparatus controller 30 may receive a departure or arrival time of an airplane, to which the corresponding passenger boarding bridge will be connected, from the flight management server 10, and control the passenger boarding bridge air-conditioning system 40 to operate the tunnel air-conditioning apparatus and the extended tunnel air-conditioning apparatus when the preset time is reached.

Otherwise, the passenger boarding bridge air-conditioning apparatus controller 30 may receive a departure or arrival time of an airplane, to which the corresponding passenger boarding bridge will be connected, from the display controller 20, which will be described later, and control the passenger boarding bridge air-conditioning system 40 to operate the tunnel air-conditioning apparatus and the extended tunnel air-conditioning apparatus when the preset time is reached.

After completion of passenger handling for the airplane, to which the passenger boarding bridge will be connected, the passenger boarding bridge air-conditioning apparatus controller 30 may detect an ending signal from the passenger boarding bridge and stop the operation of the tunnel air-conditioning apparatus and the extended tunnel air-conditioning apparatus.

By way of example, as illustrated in FIG. 8, the ending signal may be transmitted by the passenger boarding bridge manager 300 to the passenger boarding bridge air-conditioning apparatus controller 30 to control the passenger boarding bridge air-conditioning system 40. The passenger boarding bridge manager 300 may monitor and control the operation of the passenger boarding bridge, and simultaneously, monitor and control the tunnel air-conditioning apparatus and the extended tunnel air-conditioning apparatus included in the passenger boarding bridge air-conditioning system included in each passenger boarding bridge.

Otherwise, as illustrated in FIG. 8, the ending signal may be transmitted by the display controller 20, which will be described later, to the passenger boarding bridge air-conditioning apparatus controller 30 to control the passenger boarding bridge air-conditioning system 40.

In addition, the passenger boarding bridge air-conditioning apparatus controller 30 may stop the operation of the tunnel air-conditioning apparatus and the extended tunnel air-conditioning apparatus after a preset time from a departure time of departure information of the airplane, to which the passenger boarding bridge will be connected, or an arrival time of arrival information thereof.

Time required for passengers to get off an airplane varies depending on a size of an airplane; however, desirably, the operation of the tunnel air-conditioning apparatus and the extended tunnel air-conditioning apparatus may be stopped after about 10 to about 15 minutes from the time that the connection of the passenger boarding bridge to the airplane is completed.

Furthermore, the operation of the tunnel air-conditioning apparatus and the extended tunnel air-conditioning apparatus may be manually stopped by the passenger boarding bridge manager 300, or automatically stopped in response to an operation stop signal received after all passengers board the airplane, and the passenger boarding bridge is disconnected from the airplane.

In addition, the passenger boarding bridge air-conditioning apparatus controller 30 may receive departure and arrival information from the flight management server 10 through the display controller 20 to control the passenger boarding bridge air-conditioning system 40.

The display controller 20 may receive flight information of an airplane from the flight management server 10 to display the information in a design suitable for characteristics of the information by types or locations.

By way of example, the display controller 20 may control a FIDS as illustrated in FIG. 8. The FIDS performs displaying overall departures or arrivals of airplanes.

Also, the display controller 20 may control a GIDS as illustrated in FIG. 8. The GIDS performs displaying information about gates for departures or arrivals of airplanes.

Referring to FIG. 8, the display controller 20 may receive information about a departure or arrival time of an airplane from the flight management server 10 to notify the flight information of the airplane, and transmit the information about the departure or arrival time of the airplane, which has been received from the flight management server 10, to the passenger boarding bridge air-conditioning apparatus controller 30 to control the passenger boarding bridge air-conditioning system 40.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A tunnel air-conditioning apparatus for air-conditioning a movable tunnel connected to a rotunda, the tunnel air-conditioning and heating apparatus comprising:
   an indoor unit that is provided on the movable tunnel;
   an outdoor unit that is provided on and connected to the indoor unit; and
   an outdoor-unit support unit that supports the outdoor unit to make the outdoor unit provided on the indoor unit,
   wherein the outdoor-unit support unit comprises an upper support that provides the outdoor unit on a top surface thereof; a lower support that provides the indoor unit on a top surface thereof; and a lift that is capable of lifting and lowering the upper support with respect to the lower support, so as to lift or lower the outdoor unit to adjust a space formed on a top part of the indoor unit.

2. The tunnel air-conditioning apparatus of claim 1, wherein with respect to the lift, two (2) lifts are provided, and
   the two (2) lifts are installed at both ends of the lower support along a longitudinal length of the movable tunnel.

3. The tunnel air-conditioning apparatus of claim 1, wherein one of both ends of the outdoor unit, which is adjacent to the rotunda, is provided to not be interfered with the rotunda.

4. The tunnel air-conditioning apparatus of claim 1, wherein the lift is provided between the upper support and the lower support, and if the other end of the outdoor unit is protruded toward a direction away from the rotunda with respect to the upper support, the lift is accentrically provided in the direction away from the rotunda, compared to the upper support and the lower support, in order to avoid overturn of the outdoor unit.

5. The tunnel air-conditioning apparatus of claim 1, wherein the lower support has a perpendicular support rod that supports the upper support at a height of a limit for the lowering of the upper support by the lift.

6. The tunnel air-conditioning apparatus of claim 1, wherein the lift is a scissors lift.

7. The tunnel air-conditioning apparatus of claim 6, wherein the lift comprises scissors having a first arm, of which one end is connected to the upper support, and the other end is connected to the lower support, and a second arm, of which one end is connected to the lower support, and the other end is connected to the upper support.

8. The tunnel air-conditioning apparatus of claim 7,
wherein in the lift, the other end of the first arm and the other end of the second arm are fixed, the one end of the first arm slides along the upper support, and the one end of the second arm slides along the lower support, and thereby, lifting or lowering the upper support.

9. The tunnel air-conditioning apparatus of claim 8,
wherein one end of the first arm is positioned closer to the rotunda than the other end of the first arm, and slides along a longitudinal direction of the movable tunnel.

10. The tunnel air-conditioning apparatus of claim 7,
wherein at the scissors, there may be installed a shock absorber to perform a buffering function when the upper support is lowered, or a hydraulic or power cylinder to facilitate the lift of the upper support.

11. The tunnel air-conditioning apparatus of claim 1,
wherein a compressor is provided in the inside of the outdoor unit.

12. The tunnel air-conditioning apparatus of claim 11,
wherein the compressor is a scroll type compressor or a rotary type compressor.

13. A passenger boarding bridge air-conditioning system, comprising:
the tunnel air-conditioning apparatus according to claim 1; and
an extended tunnel air-conditioning apparatus that air-conditions an extended tunnel connected to the other end of the movable tunnel in the longitudinal direction of the movable tunnel to enable a length of the passenger boarding bridge to be extended or diminished.

14. The passenger boarding bridge air-conditioning system of claim 13,
wherein the indoor unit of the extended tunnel air-conditioning apparatus comprises a first air supply fan and a second air supply fan, and
the first air fan is positioned closer to the movable tunnel than the second air supply fan.

15. The passenger boarding bridge air-conditioning system of claim 14,
wherein the extended tunnel air-conditioning apparatus comprises
a connection opening that is connected to each of the first and second air supply fans, to enable air discharged from the first and second air supply fans to be transferred to a duct of the extended tunnel,
the interior of the connection opening is partitioned to avoid that the air discharged from the first air supply an and the air discharged from the second air supply fan are mixed from each other.

16. The passenger boarding bridge air-conditioning system of claim 15,
wherein on/off of each of the first and second air supply fans is independently controlled.

17. The passenger boarding bridge air-conditioning system of claim 16,
wherein on either an outer surface of the movable tunnel or an inner surface of the extended tunnel, there is provided an on/off unit that controls on/off of the first air supply fan, and on the other one, there is a fixing member that operates the on/off unit, and
any one of the on/off unit and the fixing member is provided at a position corresponding to a moving line of the other one when the extended tunnel is extended or diminished.

18. The passenger boarding bridge air-conditioning system of claim 17,
wherein on the outer surface of the movable tunnel, there is provided the on/off unit to be protruded toward the exterior of the movable tunnel, and
on the inner surface of the extended tunnel, there is provided the fixing member to be protruded toward the interior of the extended tunnel.

19. The passenger boarding bridge air-conditioning system of claim 18,
wherein when the fixing member moves as the extended tunnel moves in the direction of diminishing the length of the passenger boarding bridge, the on/off unit makes the first air supply fan off in response to the movement of the fixing member, and
when the fixing member moves as the extended tunnel moves in the direction of extending the length of the passenger boarding bridge, the on/off unit makes the first air supply fan on in response to the movement of the first air supply fan.

20. The passenger boarding bridge air-conditioning system of claim 19,
wherein the on/off unit is a toggle switch,
when the on/off unit contacts the fixing member to be operated in an off direction as the fixing member moves by the extended tunnel moving in the direction of diminishing the length of the passenger boarding bridge, the first air supply fan is off, and
when the on/off unit contacts the fixing member to be operated in an on direction as the fixing member moves by the extended tunnel moving in the direction of extending the length of the passenger boarding bridge, the first air supply fan is on.

21. The passenger boarding bridge air-conditioning system of claim 19,
wherein the on/off unit is a first sensor and a second sensor positioned in order in the direction of extending the extended tunnel,
when the fixing member is sensed by the second sensor, and then, by the first sensor as the fixing member moves by the extended tunnel moving in the direction of diminishing the length of the passenger boarding bridge, the first air supply fan is off, and
when the fixing member is sensed by the first sensor, and then, by the second sensor as the fixing member moves by the extended tunnel moving in the direction of extending the length of the passenger boarding bridge, the first air supply fan is on.

22. The passenger boarding bridge air-conditioning system of claim 13,
wherein a compressor is provided in the inside of the outdoor unit of the extended tunnel air-conditioning apparatus.

23. The passenger boarding bridge air-conditioning system of claim 22,
wherein the compressor provided in the inside of the outdoor unit of the extended tunnel air-conditioning apparatus is a scroll type compressor or a rotary type compressor.

24. A passenger boarding bridge, comprising:
a rotunda;
a movable tunnel that is rotatably connected to the rotunda; and
an extended tunnel that is connected to an end of the movable tunnel opposite to the end of the movable tunnel where the movable tunnel and the rotunda are connected to each other,
wherein the extended tunnel moves slidingly to accommodate part of the movable tunnel therein, and the passenger boarding bridge air-conditioning system according to claim 13 is installed in the rotunda, the movable tunnel, and the extended tunnel.

25. A passenger boarding bridge air-conditioning control system, comprising:
the passenger boarding bridge air-conditioning system according to claim 13; and
a flight management server that stores and updates departure and arrival information of an airplane, and information of the number of passengers; and
a passenger boarding bridge air-conditioning apparatus controller that receives the departure and arrival information and the information of the number of passengers from the flight management server to control the passenger boarding bridge air-conditioning system.

26. The passenger boarding bridge air-conditioning control system of claim 25,
wherein the passenger boarding bridge air-conditioning apparatus controller operates the tunnel air-conditioning apparatus and the extended tunnel air-conditioning apparatus prior to a preset time earlier than a departure time of the departure information of an airplane, to which the passenger boarding bridge will be connected, and an arrival time of the arrival information thereof.

27. The passenger boarding bridge air-conditioning control system of claim 25,
wherein after completion of passenger handling for the airplane, to which the passenger boarding bridge will be connected, the passenger boarding bridge air-conditioning apparatus controller senses an ending signal from the passenger boarding bridge to stop the operation of the tunnel air-conditioning apparatus and the extended tunnel air-conditioning apparatus.

28. The passenger boarding bridge air-conditioning control system of claim 25,
wherein the passenger boarding bridge air-conditioning apparatus controller stops the operation of the tunnel air-conditioning apparatus and the extended tunnel air-conditioning apparatus after the preset time based on the departure time of the departure information of the airplane, to which the passenger boarding bridge will be connected, or the arrival time of the arrival information thereof.

29. The passenger boarding bridge air-conditioning control system of claim 25,
wherein the passenger boarding bridge air-conditioning apparatus controller stops the operation of the tunnel air-conditioning apparatus and the extended tunnel air-conditioning apparatus after the preset time in response to the information of the number of passengers from the flight management server.

30. The passenger boarding bridge air-conditioning control system of claim 25,
wherein the passenger boarding bridge air-conditioning apparatus controller receives the departure information, the arrival information and the information about the number of passengers from the flight management server through a display controller to control the passenger boarding bridge air-conditioning system.

31. The passenger boarding bridge air-conditioning control system of claim 25,
wherein the passenger boarding bridge air-conditioning system is applied to a single passenger boarding bridge or each of a plurality of passenger boarding bridge.

* * * * *